US005248543A

United States Patent [19]

Yamaguchi et al.

[11] Patent Number: 5,248,543

[45] Date of Patent: Sep. 28, 1993

[54] THERMAL IMAGE TRANSFER SHEET AND THERMAL IMAGE TRANSFER RECORDING MEDIUM FOR USE WITH CLOTHING

[75] Inventors: Junko Yamaguchi, Shimizu; Shuhei Shiraishi, Mishima; Shigeyuki Harada, Numazu; Masanaka Nagamoto, Susono, all of Japan

[73] Assignee: Ricoh Company, Ltd., Tokyo, Japan

[21] Appl. No.: 640,883

[22] Filed: Jan. 14, 1991

[30] Foreign Application Priority Data

| | | | |
|---|---|---|---|
| Jan. 18, 1990 | [JP] | Japan | 2-8758 |
| Apr. 13, 1990 | [JP] | Japan | 2-98194 |
| Jun. 6, 1990 | [JP] | Japan | 2-148411 |
| Aug. 10, 1990 | [JP] | Japan | 2-213030 |

[51] Int. Cl.$^5$ ................ B32B 3/00

[52] U.S. Cl. ................ 428/195; 428/484; 428/488.1; 428/488.4; 428/913; 428/914

[58] Field of Search ................ 428/195, 484, 488.1, 428/488.4, 913, 914

[56] References Cited

U.S. PATENT DOCUMENTS 4,681,796 7/1987 Maehashi et al. ................ 428/212
4,720,480 1/1988 Ito et al. ................ 503/227

*Primary Examiner*—Patrick J. Ryan
*Assistant Examiner*—Elizabeth Evans
*Attorney, Agent, or Firm*—Oblon, Spivak, McClelland, Maier & Neustadt

[57] ABSTRACT

A thermal image transfer sheet comprises a support and an ink layer formed thereon, which ink layer comprises as the main components a colorant and at least one binder resin selected from the group consisting of polyvinyl butyral resin, vinyl chloride resin, vinylidene chloride resin, vinylidene chloride-acrylonitrile copolymer resin, fluorine-containing resin, polyamide or a copolymer thereof, polyethylene resin, polypropylene resin, polyester resin, NBR, and ethylene - vinyl acetate copolymer resin, and a thermal image transfer recording medium comprises the thermal image transfer sheet and an image-receiving member is composed of a support and an image-receiving layer preferably comprising as the main component a polyamide and/or a copolymer of the polyamide, or an image-receiving layer made of nylon 6 or nylon 66.

5 Claims, No Drawings

THERMAL IMAGE TRANSFER SHEET AND THERMAL IMAGE TRANSFER RECORDING MEDIUM FOR USE WITH CLOTHING

BACKGROUND OF THE INVENTION

1. Field of the Invention

The present invention relates to a thermal image transfer sheet and a thermal image transfer recording medium for use with clothing, and more particularly, to a thermal image transfer sheet for use with clothing which provides an large including characters, symbols, and the like, with good transfer characteristics, which is superior in withstands both dry cleaning and laundering (hereinafter simply 'withstanding cleaning') on a label for carrying instructions about the care of clothing or on the clotting itself, and also to a thermal image transfer recording medium for use with clothing which is a combinations of the thermal image transfer sheet and an image-receiving member.

2. Discussion of Background

Many types of thermal image transfer sheets for use with clothing have been proposed up to the present time. In particular, in the case where a pattern-type ink layer from the thermal image transfer sheet is formed on an image-receiving member, intensive investigations have been carried out into images formed on the image-receiving member which show good capability in withstanding cleaning. At the present time, this objective is dependent upon the fixing characteristics of a binder resin which is one of the elements making up a thermal image transfer layer.

For example, the following have been proposed as binder resins:

(1) A polyamide resin and a non-crystalline polyester resin and/or an epoxy resin [Japanese Laid-Open Patent Application 61-244593);

(2) A non-crystalline polyester resin with a glass transition temperature of 40° C. or more and a number average molecular weight of 10,000 or less, and preferably an aromatic polyester containing a bisphenol component with a glass transition temperature of 50° C. to 80° C. and a number average molecular weight of 5000 or less (Japanese Laid Open Patent Application 62-13384);

(3) A polymerized fatty acid type of polyamide resin (Japanese Laid Open Patent Application 62-66991);

(4) At least one resin selected from the group consisting of a vinyl chloride - vinyl acetate copolymer resin, an acrylic-vinyl acetate copolymer resin, a methacrylic - vinyl acetate copolymer resin, and a vinyl acetate resin (Japanese Laid-Open Patent Application 63-56490);

(5) A butyral resin (Japanese Laid-Open Patent Application 63-82786); and (6) A binder resin containing a fatty acid amide or fatty acid imide with a melting point of 120° C. or more and a polyamide resin or vinyl resin with a melting point of 100° C. or more (Japanese Laid Open Patent Application 63-179791).

However, the image formed from a thermal image transfer ink dispersed as a colorant in these conventional binder resins uses a material as an ink component which dissolves in the cleaning solvents (water, hot water, 1,1,1-trichloroethane, Perclene, naphtha, and the like) so that the image does not satisfactorily withstand cleaning.

SUMMARY OF THE INVENTION

It is therefore a first object of the present invention to provide, with due consideration to the drawbacks of such conventional materials, a thermal image transfer sheet for use with clothing which can form a transfer image with good transfer characteristics capable of withstanding both dry cleaning and laundering.

A second object of the present invention is to provide a thermal image transfer recording medium for use with clothing which is a combination of the above thermal image transfer sheet and an image-receiving member.

The first object of the present invention can be achieved by a thermal image transfer sheet comprising a support and an ink layer formed thereon, which comprises as the main components a colorant and at least one binder resin selected from the group consisting of polyvinyl butyral resin, vinyl chloride resin, vinylidene chloride resin, vinylidene chloride - acrylonitrile copolymer resin, fluorine-containing resin, polyamide or copolymer thereof, polyethylene resin, polypropylene resin, polyester resin, NBR, and ethylene - vinyl acetate copolymer resin.

In the above thermal image transfer sheet, it is preferable that the binder resin be a polyamide copolymer containing at least nylon 12, with a melting point in the range of 80° C. to 150° C. measured by a differential scanning calorimeter (hereinafter referred to as the DSC), with the parts-by-weight ratio of the colorant to the polyamide copolymer resin in the ink layer being in the range of 30/70 to 70/30.

In these thermal image transfer sheets, a release layer comprising wax as the main component may be provided between the support and the ink layer.

The second object of the present invention can be achieved by a thermal image transfer recording medium comprising any of the above-mentioned thermal image transfer sheets and an image-receiving member.

The image-receiving member may comprise a support and an image-receiving layer formed thereon, or may be composed of a single member, for instance, a fabric or film comprising nylon 6 or nylon 66. The image-receiving layer may comprise at least one resin component selected from the group consisting of polyvinyl butyral resin, vinyl chloride resin, vinylidene chloride resin, vinylidene chloride - acrylonitrile copolymer resin, fluorine-containing resin, polyamide or copolymer thereof, polyethylene resin, polypropylene resin, polyester resin, NBR, ethylene - vinyl acetate copolymer resin, polyacrylonitrile resin, polyurethane resin, and vinyl chloride - vinyl acetate copolymer resin.

In the above thermal image transfer recording medium, it is preferable that the image-receiving layer comprise as the main components (i) a polyamide and/or a copolymer of the polyamide, or (ii) polyurethane resin.

Furthermore, in the above thermal image transfer recording medium, it is preferable that the polyamide or copolymer thereof for the image-receiving layer, and the nylon 6 and nylon 66 for the image-receiving member have a melting point in the range of 150° C. to 250° when measured using the DSC.

DESCRIPTION OF THE PREFERRED EMBODIMENTS

The inventors of the present invention have conducted research to eliminate the problems which have been previously outlined, and have discovered that it is effective to use a thermal image transfer sheet comprising a support and a thermal transfer ink layer formed thereon comprising as the main components a colorant and a thermoplastic resin which is insoluble in cleaning solvents, and a thermal image transfer recording medium comprising the above thermal image transfer sheet and an image-receiving member of a single member type or a double-member type, which comprises a support and an image-receiving layer comprising as the main component a material insoluble in cleaning solvents. The present invention is based upon this discovery.

The present invention will now be explained in more detail.

A thermal image transfer sheet for clothing of the present invention is prepared by providing a thermal transfer ink layer on a support directly, or through a release layer. The support is, for example, a plastic film with a thickness of about 3 to 10 μm, such as polyester film, polycarbonate film, polyimide film, all aromatic polyamide film, polyether ether ketone film, and polysulfone film.

Preferably the thermal transfer ink layer has a deposited weight of 0.1 to 3.0 g/m$^2$, more preferably about 0.5 to 2.0 g/m$^2$.

It is preferable to use a colorant which is not affected by cleaning solvents. Carbon black and other inorganic pigments and organic dyes and pigments, and the like can be used. Among these, carbon black is particularly desirable.

Examples of thermoplastic resins which are insoluble in cleaning solvents have been given previously, but (i) nylon 12 and its copolymers, (ii) vinylidene fluoride, and (iii) ethylene-vinyl acetate copolymer resins containing less than 20 wt % vinyl acetate which are insoluble in cleaning solvents and have good thermal transfer properties are particularly preferable. It is also preferable that the melting point or softening point of these resins be in the 50° to 200° C. range. However, materials which are soluble in cleaning solvents because of their molecular weight or modification are, of course, not suitable.

In addition to the above, (iv) polyamide copolymer (copolymer of polyamide copolymerized using at least a nylon 12 monomer) containing at least nylon 12, with a melting point by the DSC method in the 80° to 150° C. range can also be used. Here, the melting point measured by the DSC method is the temperature at the main melting peak.

Examples which can be given of polyamides (nylon) or their copolymers with melting points in the 50° to 200° C. range are as follows:

(1) Homopolymers $$-\!\!\left(R-\overset{\overset{O}{\|}}{C}-NH\right)\!\!-_n$$

| —R— | |
|---|---|
| $-(CH_2)_7-$ | Nylon 8, m.p. 190° C. |
| $-(CH_2)_9-$ | Nylon 10, m.p. 183° C. |
| $-(CH_2)_{10}-$ | Nylon 11, m.p. 184° C. |
| $-(CH_2)_{11}-$ | Nylon 12, m.p. 177° C. |

(2) Two-component Type Copolymers

-continued $$-\!\!\left(R-\overset{\overset{O}{\|}}{C}-NH-R'-NH-\overset{\overset{O}{\|}}{C}\right)\!\!-_n$$

| —R— | —R'— | |
|---|---|---|
| $-(CH_2)_2-$ | 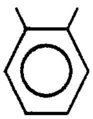 | m.p. 139° C. |
| $-(CH_2)_6-$ |  | m.p. 150° C. |
| $-(CH_2)_8-$ | $-(CH_2)_8-$ | m.p. 197° C. |
| 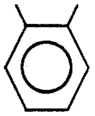 | 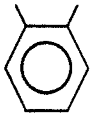 | m.p. 185° C. |

(3) Three-component Type Copolymers

| | |
|---|---|
| Nylon 6/66/610 | (m.p. 150° C.) |
| Nylon 6/66/12 | (m.p. 119° C.) |
| Nylon 6/66/12 | (m.p. 100° C.) |

It is preferable that the ratio by weight of the colorant to the binder resin be in the 20/80 to 90/10 range, and more preferably in the 30/70 to 70/30 range. If a higher percentage of colorant is used, the ink layer has a tendency to leave the support and the resistance to abrasion of the formed image becomes insufficient for use in practice. Conversely, if a smaller percentage of colorant is used the ink layer has a large aggregation power so that a middle portion of a character such as "a" tend to be peeled off the support, together with its outer portion.

In addition, other materials such as resins, waxes and surfactants can be added to the ink layer as required to increase the thermal sensitivity of the ink layer, to prevent the ink layer from leaving the support, to improve the dispersion characteristics of the ink layer in the course of the deposition thereof, but a minimum of these additives should be used so that the ability to withstand cleaning is not reduced.

The above-mentioned materials for the ink layer are dispersed in a suitable solvent, other than a cleaning solvent, before use, or are dispersed by melting before use.

The release layer provided as required between the support and the ink layer ensures good separation of the support and the ink layer during printing. Heat is applied from a thermal head, whereupon the release layer melts and becomes a low-viscosity liquid. A structure by which the release layer breaks away easily close to the boundary between a thermally printed section and a non-printed section is acceptable. Accordingly, the main component of the release layer is preferably a wax-like material which is solid at room temperature and melts when heat is applied.

Examples of such a wax-like material include natural waxes such as beeswax, carnauba wax, whale tallow, Japan wax, candelilla wax, rice bran wax, montan wax, and the like; synthetic waxes such as paraffin wax, microcrystalline wax, oxidized wax, ozokerite, ceresin, ester wax, polyethylene wax, and the like. In addition, higher fatty acids, such as margaric acid, lauric acid, myristic acid, palmitic acid, stearic acid, phloionic acid, behenic acid, and the like; higher alcohols, such as stearyl alcohol, behenyl alcohol, and the like; esters, such as fatty acid esters of sorbitan, and the like; and amides such as stearamide, oleamide, and the like, can be given as examples. To ensure the resilience of the release layer, thereby maintaining good adherence between the ink sheet and the image-receiving member, rubbers such as isoprene rubber, butadiene rubber, ethylene propylene rubber, butyl rubber, nitrile rubber, and the like may be added, and/or to ensure adherence to the release layer, thereby preventing separation of the release layer, resins such as ethylene-vinyl acetate copolymer, ethylene-ethyl acrylate copolymer, and the like may also be added.

It is preferable that the deposited weight of the release layer be in the 0.5 to 8 g/m$^2$ range, and more preferably in the 1 to 5 g/m$^2$ range.

In a thermal image transfer medium which is a combination of a thermal image transfer sheet of this type and an image-receiving member, the thermal image transfer sheet described above can be used without modification. The image-receiving member comprises a support and an image-receiving layer formed thereon, which comprises as the main component a material insoluble in cleaning solvents. Specifically, the resins which can be used in the ink layer, polyacrylonitrile resin, polyurethane resin, and vinyl chloride - vinyl acetate copolymer resin can be used.

In addition, polyamide and its copolymers, preferably those with a DSC melting point in the 150° to 250° C. range, can be used in the image-receiving layer of the image-receiving member. Nylon 6, nylon 66, and nylon 610 can also be used.

In the image-receiving layer, other materials which can be used to improve the whiteness or the transfer characteristics of the image-receiving member include white pigments such as titanium oxide, silica, alumina and zinc oxide. A plasticizer may also be added to impart flexibility to the image-receiving layer. These materials for the image-receiving layer are either dissolved or dispersed in a suitable solvent or dispersed by melting when used.

It is preferable that the deposited weight of the image-receiving layer be in the 1 to 30 g/m$^2$ range, more preferably in the 3 to 20 g/m$^2$ range. The deposited weight is defined as the weight deposited on the surface of the support. This does not include the part which penetrates the support or the part adhering to the back of the support.

Paper, film, fabric, and the like can be used on the support of the image-receiving member. Desirable types of paper are those rendered waterproof by a resin or the like, or synthetic paper or the like. The fabric may be formed from a synthetic fiber such as rayon, Bemberg (trademark), acetate, nylon, polyester, or a natural fiber such as cotton or silk. They may be fabricated by mixed spinning or used as non-woven fabrics. Suitable films include those of polyester, polyolefin, acetate, polycarbonate, polyimide, polyamide, and the like.

With the image-receiving member, including image-receiving member, there is a problem that a image-receiving layer must be provided on the support member.

By contrast, an image-receiving member made from a woven fabric of nylon 6 or nylon 66, or from a woven fabric comprising nylon 6 or nylon 66 as its main component, does not have the above-mentioned problem. These synthetic fibers (nylon 6, nylon 66) are not special fibers but are rather the common type in wide use. When the support member is made of these synthetic fibers, because they are the same materials used in the ink layer, the support member has excellent compatibility with the ink layer, or the ink layer can be adhered to the support member very well, so that an image is obtained with superior thermal transfer characteristics and resistance to cleaning solvents.

Metallic salts, organic compounds, inorganic acids, and the like may be added to these fibers to improve the heat resistance. Organic or inorganic heavy metal ions, and ultraviolet absorbing agents may also be added to improve weather resistance and light resistance. Titanium oxide can also be added to eliminate the glossiness of the fibers.

Depending on the application, these fibers may be woven into plain fabrics, or have a satin weave, and the like. For example, in the case of a portion where the fabric is not worn in direct contact with the skin (where the tactile sensation is not important) a plain fabric is suitable, but where the fabric contacts the skin directly, or gloss or outward appearance is considered important, the satin weave is preferable.

The thermal transfer characteristics of the image-receiving member can be further improved if the surface of the fiber has a degree of smoothness greater than 20 sec. The surface smoothness of the fabric can be increased (i) by increasing the thread density, which is defined by the denseness of the warp and woof, expressed as number of threads per inch, (ii) by making the thread finer, or (iii) by shrinking the fabric with application of heat and/or pressure.

The features of the present invention will become apparent in the course of the following description of examples of the present invention and comparative examples. The examples of the present invention are given for illustration of the invention, and are not intended to be limiting thereof.

EXAMPLES 1 TO 9

Thermal image transfer sheets for clothing No. 1 to No. 9 according to the present invention were prepared by applying liquid compositions No. 1 to No. 9 with the following compositions, respectively, to a support member of polyester film with a thickness of about 4.5 μm, then drying the applied liquid compositions to provide an ink layer of a deposited weight of about 1 g/m$^2$.

| | Parts by Weight |
|---|---|
| Liquid Composition No. 1 | |
| Carbon black | 6.5 |
| Polyvinylbutyral resin | 6.5 |
| Ethylene/toluene (1:1) mixed solvent | 87 |
| Liquid Composition No. 2 | |
| Carbon black | 7.5 |
| Polyester resin (Trademark "Desmophen" commercially available from Sumitomo Bayer Urethane Co., Ltd.) | 7.5 |
| Isopropyl alcohol | 85 |
| Liquid Composition No. 3 | |
| Carbon black | 7.5 |
| Nylon 11 (m.p. 184° C.) | 7.5 |
| Phenol | 85 |

-continued

| | Parts by Weight |
|---|---|
| Liquid Composition No. 4 | |
| Carbon black | 3.5 |
| Fluorine-containing resin (PVF) | 3.5 |
| Methyl ethyl ketone | 93 |
| Liquid Composition No. 5 | |
| Carbon black | 5 |
| Ethylene - vinyl acetate copolymer resin (containing 28 wt. % vinyl acetate) | 5 |
| Toluene | 90 |
| Liquid Composition No. 6 | |
| Carbon black | 5 |
| Ethylene - vinyl acetate copolymer resin (containing 10 wt. % vinyl acetate) | 5 |
| Toluene | 90 |
| Liquid Composition No. 7 | |
| Carbon black | 3.5 |
| Vinylidene fluoride | 3.5 |
| Methyl ethyl ketone | 93 |
| Liquid Composition No. 8 | |
| Carbon black | 7.5 |
| Nylon 6/66/12 (m.p. 119° C.) | 7.5 |
| Methanol | 85 |
| Liquid Composition No. 9 | |
| Carbon black | 7.5 |
| Nylon 6/610/12 (m.p. 100° C.) | 7.5 |
| Methanol | 85 |

COMPARATIVE EXAMPLES 1 TO 3

Comparative thermal image transfer sheets for clothing, No. 1 to No. 3 were prepared by applying comparative liquid compositions No. 1 to No. 3 with the following compositions, respectively, to a support member of polyester film with a thickness of about 4.5 μm, then drying the applied liquid compositions to provide an ink layer of a deposited weight of about 1 g/m$^2$.

| | Parts by Weight |
|---|---|
| Comparative Liquid Composition No. 1 | |
| Carbon black | 7.5 |
| Polyvinyl alcohol | 7.5 |
| Water | 85 |
| Comparative Liquid Composition No. 2 | |
| Carbon black | 7.5 |
| Acrylic resin | 7.5 |
| Methyl ethyl ketone | 85 |
| Comparative Liquid Composition No. 3 | |
| Carbon black | 7.5 |
| Styrene resin | 7.5 |
| Toluene | 85 |

EXAMPLE 10

A release layer with the following composition with a dry deposited weight of about 1 g/m$^2$ was provided on a support member of polyester film with a thickness of about 4.5 μm.

| Composition of Release Layer | Parts by Weight |
|---|---|
| Paraffin wax | 9 |
| Ethylene - vinyl acetate copolymer resin | 1 |
| Toluene | 90 |

Liquid composition No. 6 employed in Example 6 was applied to a support member of polyester film with a thickness of about 4.5 μm, and the applied liquid composition was dried to provide an ink layer of a deposited weight of about 1 g/m$^2$, whereby thermal image transfer sheet No. 10 according to the present invention was prepared.

A sticking prevention material with the following composition was prepared by mixing the following components:

| | Parts by Weight |
|---|---|
| Silicone rubber (30%) | 10 |
| Toluene | 90 |
| Curing agent (CAT-PL-8) | 0.1 |

The thus prepared sticking prevention material was applied to the side opposite to the ink layer of each of the support members of the thermal image transfer sheets No. 1 to No. 13 according to the present invention and comparative thermal image transfer sheets No. 1 to No. 3 of Comparative Examples 1 to 3, and dried to provide a sticking prevention layer with a thickness of about 0.1 μm.

Preparation of Image-receiving Members (A) to (M)

Image-receiving Member (A)

A mixture of the following components was applied by a wire bar to the surface of a polyacetate fabric and dried, whereby an image-receiving layer with a deposition amount of about 10 g/m$^2$ (when dried) was formed on the polyacetate fabric. Thus, image-receiving member (A) was prepared:

| | Parts by Weight |
|---|---|
| 20% solution of polyvinyl butyral in a mixed solvent of toluene/ethanol (1:1) by weight | 25 |
| Toluene/ethanol (1:1) mixed solvent | 75 |

Image-receiving Member (B)

A mixture of the following components was applied to the surface of a nylon fabric using a wire bar, and then dried to form an image-receiving layer. The image-receiving layer was washed with water and dried again, whereby an image-receiving layer with a deposition amount of about 10 g/m$^2$ (when dried) was formed on the nylon fabric. Thus, image-receiving member (B) was prepared:

| | Parts by Weight |
|---|---|
| Nylon 6 | 5 |
| Potassium chloride | 19 |
| Methanol | 76 |

Image-receiving Member (C)

A mixture of the following components was thoroughly dispersed in a ball mill and was applied to the surface of a nylon fabric using a wire bar, and then dried, whereby an image-receiving layer with a deposition amount of about 10 g/m$^2$ (when dried) was formed on the nylon fabric. Thus, image-receiving member (C) was prepared:

| | Parts by Weight |
|---|---|
| Nylon 12 copolymer | 5 |
| Finely-divided titanium oxide particles | 1 |

-continued

| | Parts by Weight |
|---|---|
| Methanol | 94 |

Image-receiving Member (D)

A mixture of the following components was thoroughly dispersed in a ball mill and was applied to the surface of a sheet of high quality paper using a wire bar, and then dried, whereby an image-receiving layer with a deposition amount of about 10 $g/m^2$ (when dried) was formed on the high quality paper. Thus, image-receiving member (D) was prepared:

| | Parts by Weight |
|---|---|
| Nylon 12 copolymer | 5 |
| Finely-divided titanium oxide particles | 1 |
| Methanol | 94 |

Image-receiving Member (E)

A mixture of the following components was applied to the surface of a polyester fabric using a wire bar, and then dried, whereby an image-receiving layer with a deposition amount of about 5 $g/m^2$ (when dried) was formed on the polyester fabric. Thus, image-receiving member (E) was prepared:

| | Parts by Weight |
|---|---|
| Polyurethane resin methyl ethyl ketone 20 wt. % solution | 25 |
| Methyl ethyl ketone | 6.4 |

Image-receiving Members (F) to (M)

Image-receiving members (F) to (M) were prepared by use of the fabrics as set forth in the following TABLE 1:

TABLE 1

| Image-receiving Member | Material | Weave | Thread Thickness (warp/woof) | Density (warp/woof) | Bekk's Smoothness |
|---|---|---|---|---|---|
| F | Nylon 6 | Plain Weave | 70D/70D | 150/150 | 3 sec. |
| G | Nylon 66 | Plain Weave | 70D/70D | 150/150 | 3 sec. |
| H | Nylon 6 | Satin Weave | 70D/140D | 229/86 | 1 sec. |
| I | Nylon 6 | Satin Weave | 30D/45D | 294/118 | 20 sec. |
| J | Nylon 6 | Satin Weave | 70D/140D | 229/86 | 30 sec. |
| K | Cotton | Plain Weave | 70D/70D | 150/150 | 3 sec. |
| L | Polyester | Satin Weave | 70D/140D | 150/150 | 3 sec. |
| M | Acetate | Satin Weave | 70D/140D | 150/150 | 1 sec. |

Using the thermal image transfer sheets and image-receiving members (A) to (M) prepared as outlined above, printing was carried out in a thermal image transfer printer with a line-type head, with application of printing energy of 10 to 25 $mJ/mm^2$), to determine a suitable printing energy or sensitivity, and transferred images were obtained.

The thus obtained transferred images were subjected to the following tests:

| | |
|---|---|
| Laundering test | JIS L-0844A-3 |
| Dry cleaning test | JIS L-0860 (solvent was 1,1,1-trichloroethane, at 25° C.) |

The thermal transfer characteristics were judged and evaluated visually from an estimation of the amount of ink transferred. The results are set forth in the following TABLE 2.

TABLE 2

| | Ink Sheet | Image-receiving Member | Sensitivity | Thermal Transfer Characteristics | Resistance to Washing with Water | Resistance to Dry Cleaning |
|---|---|---|---|---|---|---|
| Ex. 1 | 1 | A | 17 | Δ | ○ | ○ |
| | | B | 17 | Δ | ○ | ○ |
| | | C | 17 | Δ | ○ | ○ |
| | | D | 17 | Δ | ○ | ○ |
| | | E | 17 | Δ | ○ | ○ |
| | | M | 19 | X | Δ | Δ |
| Ex. 2 | 2 | B | 18 | Δ | ○ | ○ |
| | | M | 20 | X | Δ | Δ |
| Ex. 3 | 3 | B | 17 | Δ | ○ | ○ |
| | | M | 19 | X | Δ | Δ |
| Ex. 4 | 4 | B | 20 | Δ | ○ | ○ |
| | | M | 22 | X | Δ | Δ |
| Ex. 5 | 5 | B | 18 | Δ | ○ | ○ |
| | | M | 20 | X | Δ | Δ |
| Ex. 6 | 6 | B | 19 | Δ | ○ | ○ |
| | | M | 21 | X | Δ | Δ |
| Ex. 7 | 7 | B | 18 | Δ | ○ | ○ |
| | | M | 20 | X | Δ | Δ |
| Ex. 8 | 8 | A | 18 | ○ | Δ | ○ |
| | | B | 18 | ○ | ⊙ | ⊙ |
| | | C | 18 | ○ | ⊙ | ⊙ |
| | | D | 18 | ○ | ⊙ | ⊙ |
| | | E | 18 | ○ | ⊙ | ⊙ |
| | | F | 19 | Δ | ⊙ | ⊙ |
| | | G | 19 | Δ | ⊙ | ⊙ |

TABLE 2-continued

| | Ink Sheet | Image-receiving Member | Sensitivity | Thermal Transfer Characteristics | Resistance to Washing with Water | Resistance to Dry Cleaning |
|---|---|---|---|---|---|---|
| | | H | 19 | Δ | ◎ | ◎ |
| | | I | 19 | ○ | ◎ | ◎ |
| | | J | 19 | ○ | ◎ | ◎ |
| | | K | 22 | Δ | X | Δ |
| | | L | 19 | Δ | Δ | Δ |
| | | M | 20 | Δ | Δ | Δ |
| Ex. 9 | 9 | B | 17 | ○ | ◎ | ◎ |
| | | M | 19 | Δ | Δ | Δ |
| Ex. 10 | 10 | A | 15 | ◎ | ○ | ◎ |
| | | B | 15 | ◎ | ◎ | ◎ |
| | | C | 15 | ◎ | ◎ | ◎ |
| | | D | 15 | ◎ | ◎ | ◎ |
| | | E | 15 | ◎ | ◎ | ◎ |
| | | F | 16 | ○ | ◎ | ◎ |
| | | G | 16 | ○ | ◎ | ◎ |
| | | H | 16 | ○ | ◎ | ◎ |
| | | I | 16 | ◎ | ◎ | ◎ |
| | | J | 16 | ◎ | ◎ | ◎ |
| | | K | 19 | ○ | X | Δ |
| | | L | 16 | ○ | Δ | Δ |
| | | M | 17 | ○ | Δ | Δ |
| Comp. Ex. 1 | 11 | A | 20 | Δ | X | ○ |
| | | B | 20 | Δ | X | ○ |
| | | C | 20 | Δ | X | ○ |
| | | D | 20 | Δ | X | ○ |
| | | E | 20 | Δ | X | ○ |
| | | M | 22 | X | X | Δ |
| Comp. Ex. 2 | 12 | A | 20 | Δ | ○ | X |
| | | B | 20 | Δ | ○ | X |
| | | C | 20 | Δ | ○ | X |
| | | D | 20 | Δ | ○ | X |
| | | E | 20 | Δ | ○ | X |
| | | M | 22 | X | Δ | X |
| Comp. Ex. 3 | 13 | A | 16 | Δ | ○ | X |
| | | B | 16 | Δ | ○ | X |
| | | C | 16 | Δ | ○ | X |
| | | D | 16 | Δ | ○ | X |
| | | E | 16 | Δ | ○ | X |
| | | M | 18 | X | Δ | X |

Note) Image transfer characteristics, resistance to washing with water and resistance to dry cleaning
○: Absolutely no loss of image
○: Almost no loss of image
Δ: Slight loss of image
X: Complete loss of image A resin which is insoluble in cleaning solvents is used as a material for the ink layer in the image transfer sheet of the present invention. An image which is superior in withstanding cleaning is therefore obtained. In addition, superior image transfer characteristics and a clear image are obtained by use of a specified layer structure. In addition, by providing a specified image-receiving layer in the image receiving member, superior image transfer with considerably more effective resistance to cleaning is obtained.

What is claimed is:

1. A thermal image transfer recording medium comprising:

(a) a thermal image transfer sheet comprising a support and an ink layer formed thereon, which comprises as the main components a colorant and at least one binder resin, which is a polyamide copolymer containing at least nylon 12, with a melting point in the range of 80° C. to 150° C. measured by a differential scanning calorimeter (DSC); and (b) an image-receiving member comprising (i) a support and an image receiving layer formed thereon, comprising at least one resin component selected from the group consisting of nylon 6, nylon 66, a polyamide copolymer containing at least nylon 12, and polyurethane resin, and (ii) a fabric or film with a surface smoothness greater than 20 seconds in terms of Bekk's smoothness, comprising at least one resin component selected from the group consisting of nylon 6 and nylon 66.

2. The thermal image transfer recording medium as claimed in claim 1, wherein the parts-by-weight ratio of said colorant to said polyamide copolymer in said ink layer is in the range of 30/70 to 70/30.

3. The thermal image transfer recording medium as claimed in claim 1, wherein said thermal image transfer sheet further comprises a release layer comprising wax as the main component between said support and said ink layer.

4. The thermal image transfer recording medium as claimed in claim 1, wherein said polyamide copolymer in said image receiving layer has a melting point in the range of 150° C. to 250° C. when measured by a differential scanning calorimeter.

5. The thermal image transfer recording medium as claimed in claim 1, wherein said nylon 6 and said nylon 66 in said image receiving layer has a melting point in the range of 150° C. to 250° C. when measured by a differential scanning calorimeter.

* * * * *

UNITED STATES PATENT AND TRADEMARK OFFICE

CERTIFICATE OF CORRECTION

PATENT NO. : 5,248,543

DATED : September 28, 1993

INVENTOR(S) : Junko Yamaguchi, et al

It is certified that error appears in the above-indentified patent and that said Letters Patent is hereby corrected as shown below:

Column 1, Line 36, "[Japanese Laid-Open" should read --(Japanese Laid-Open--

Column 10, Line 29, "10 to 25 $mJ/mm^2$)" should read --10 to 25 $mJ/mm^2$--

Column 11, 1st Line after Table 2, "Note)" should read --Note:--

Column 11, 2nd Line after Table 2, "o :" should read --● :--

Signed and Sealed this

Fifteenth Day of November, 1994

Attest:

BRUCE LEHMAN

Attesting Officer

Commissioner of Patents and Trademarks